Sept. 2, 1958 — W. G. NOSTRAND — 2,850,168
FULL-FLOW FILTER
Filed Aug. 2, 1955
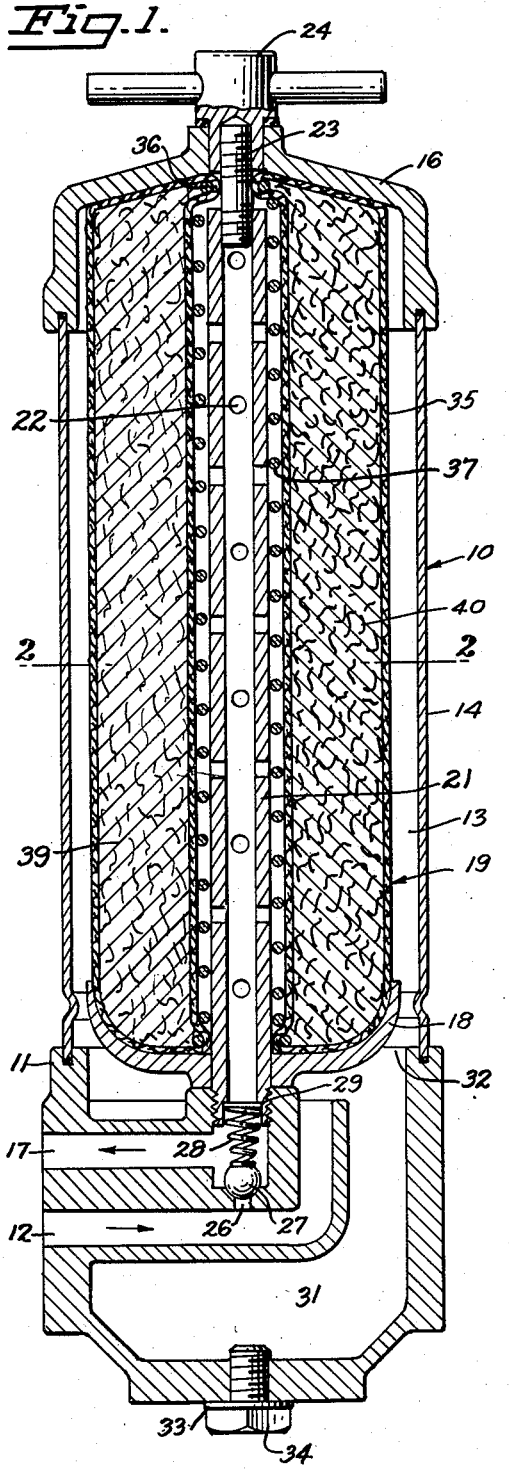
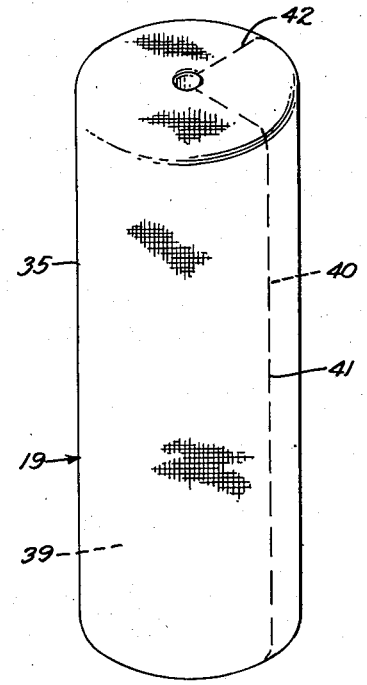
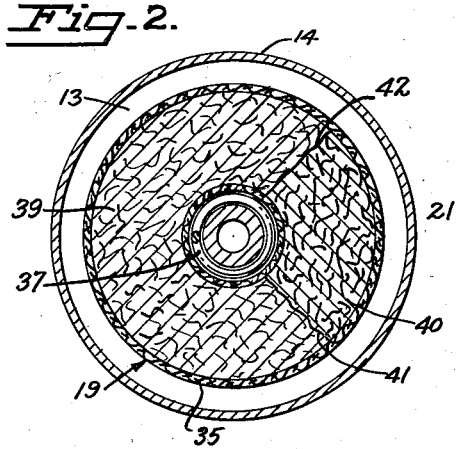
INVENTOR.
WILLIAM G. NOSTRAND
ATTORNEY

United States Patent Office 2,850,168
Patented Sept. 2, 1958

2,850,168

FULL-FLOW FILTER

William G. Nostrand, Oakland, Calif., assignor to Winslow Engineering and Manufacturing Co., Oakland, Calif., a corporation of California Application August 2, 1955, Serial No. 525,877

2 Claims. (Cl. 210—295)

This invention relates to filtering units for purifying lubricating oil and other fluids and particularly to a novel filter element or cartridge for use in connection with filtering liquids.

The invention solves an important problem in connection with the lubrication of automobile engines and is also useful in other types of engines. When an engine is starting cold, the cold lubricating oil is too viscous to circulate freely through an ordinary filter, and it will not pass through in sufficient quantities to lubricate the engine properly. Most filter units have dodged this problem by by-passing the major portion of cold oil around the filter, but this has meant that the by-passed oil received no filtering whatever, and therefore that particles of metal and other deleterious materials present in the oil were carried back into the engine. In other words, practically no filtering was done until the engine got warm, and by then considerable damage had often occurred.

An alternative to by-passing was the use of a filtering material which would pass the cold oil in satisfactory amount, but the trouble with this was that once the oil got warm, very incomplete filtering was obtained. A material that will pass cold oil cannot give as complete filtering to warm oil as a material which offers more impedance to the liquid. This meant that satisfactory filtering was obtained only when the engine was cold, and that many harmful particles passed through the filter when the engine became warm.

The present invention provides a novel type of filter having in one cartridge two different types of filter material located in a novel arrangement so that the oil can flow through both of them simultaneously, some of the oil passing through one material and the remainder of the oil passing through the other material. The two filtering materials are of different flow rate.

One of the main features of this invention is that the two materials are arranged to occupy cylindrical sectors extending the full length of the filter cartridge. One sector is a full-length fast-flow element. The other sector is a full length safety-flow element. In other words, the cartridge is generally cylindrical in form (more exactly, it comprises a cylindrical annulus), with the oil entering from the outward periphery and flowing radially inwardly into a central outlet opening, the entire filtering action being accomplished during this radially inward flow.

Along the entire length of the filter some of the oil will at all times flow through the full-length fast-flow sector, which will pass cold oil while filtering it. As the oil itself warms up and imparts its warmth to the filter cartridge, it begins to flow through the full-length safety-flow sector, spreading to it outwardly from the smaller fast-flow sector, until in a warm engine most of the oil will flow through the full length safety-flow sector and only a portion flows through the full-length fast-flow sector.

It is important to get the filter warm as quickly as possible, so that maximum utilization of the full-length safety-flow sector is availed of. This desirable object is hampered not only by the viscous nature of cold oil in a cold engine, but also by the cooling of the oil as it warms up by cold filtering material. The present invention solves this problem because at the very beginning the oil flows through the full-length fast-flow sector and warms it and almost at once begins to warm the adjacent safety-flow filter material along its full length in an increment immediately adjacent the high-flow rate material. Thus an incremental extension of the warm zone is achieved from the beginning, and the entire filter element is soon warmed.

This is in contrast with a structure where layers or discs of filtering material are stacked on each other, so that one portion comprising the fast-flow-rate material is at a different lengthwise location from another portion comprising the slow-flow-rate material. There, warming proceeds slowly in small disc-shaped increments instead of the long pie-shaped increments in the present invention where both materials extend the complete length of the cylindrical annulus, and both occupy cylindrical sectors.

The present invention therefore has as one of its objects the provision of a two-flow-rate filter having two full-length filtering sectors—a full length rapid flow sector and a full-length thorough-filtering sector.

Another object is to provide an oil filter which is quickly warmed, so that the slower-filtering portion with its more thorough action comes into use as quickly as possible and augments the filtering action of the high-flow-rate material.

Other objects and advantages of the invention will be apparent from the following description of a preferred embodiment and is presented in accordance with 35 U. S. C. 112.

Fig. 1 is a view in elevation and in section of a filtering unit embodying the principles of the present invention.

Fig. 2 is a view in section taken along the line 2—2 of Fig. 1.

Fig. 3 is a simplified view in perspective of the filter cartridge showing the two full-length sectors.

The full-flow filtering unit 10 shown in the drawing is adapted for use in the lubricating-oil system in an engine or other machine requiring a relatively low but constant flow of oil to various surfaces subject to wear. The filtering unit 10 includes a base 11 whose inlet passageway 12 is adapted to be connected to a conduit (not shown) for supplying unfiltered oil to the filter 10. This passageway 12 extends radially part of the way across the base 11 and then axially, upwardly, to near the top of the base. There it conducts the unfiltered oil into the lower end of a chamber 13 defined by a cylindrical shell 14 whose lower end is seated against and closed by the base 11 and whose upper end is seated against and closed by a removable cap 16.

An outlet passageway 17 for filtered oil extends downwardly through the axial center of the base 11 to a point directly above the inlet passageway 12, and then turns and extends laterally to an exit opening where it can be connected in any desired manner to a conduit (not shown) for carrying the filtered oil to surfaces to be lubricated. Around the upper end of the outlet passageway 17, an outwardly and upwardly flared cup 18 is preferably provided for supporting an elongated, annular filtering element or cartridge 19, which comprises the present invention and is described in more detail hereinafter.

A vertically disposed tube 21, whose lower end extends through the cup 18 and is threaded into the outlet passageway 17, projects upwardly into the central opening of the annular filtering element 19 and terminates just below the upper end thereof. Numerous perforations 22 are provided in the walls of the tube 21 at spaced points along substantially the entire length of the filtering element 19, and circumferentially around the tube. Through these perforations 22 passes the filtered oil which has flowed radially inwardly through the filtering element 19. The upper end of the tube 21 may be closed by a threaded rod or plug 23, and the upwardly extending end of the plug 23 may threadably receive a cap-retaining element 24, which is adapted to bear downwardly upon the cap 16 and force it tightly against the upper end of the shell 14.

In the event that the filtering element 19 becomes incapable of handling the required flow of oil, as when filtering elements are not changed at proper intervals, a passageway 26 will by-pass the oil from the inlet passageway 12 directly into the outlet passageway 17. The passageway 26 is normally closed by a ball 27 that is held against a suitable seat in the passageway by one end of a helical spring 28. The lower end of the tube 21 may be internally rabbeted at 29 to provide a seat for the opposite end of the helical spring. When the resistance of the filtering element 19 to the flow of oil therethrough rises above a critical value determined by the strength of the spring 28, the pressure in the inlet passageway 12 causes the ball 27 to move upwardly, allowing unfiltered oil to flow into the outlet passageway 17 at a rate sufficient to maintain the required total flow of oil through the unit.

A sump 31 is preferably formed in the bottom of the base 11 for the accumulation of particles of heavy foreign matter settling out of the unfiltered oil in the chamber 13. An opening 32 preferably extends entirely around the bottom of the chamber 13, leading to the sump except where interrupted by the partitions defining the inlet and outlet passageways 12 and 17. A drain opening 33 in the bottom of the sump 31 is normally closed by a removable plug 34, whereby the entire filtering unit may readily be flushed out and drained when the filtering element is removed for replacement.

The filtering element or cartridge 19 is of a novel type, though superficially it resembles some prior art filters in having an annular core of fibrous material covered by two layers of pervious, knitted, sheathing material 35 covering the inner, outer, and end surfaces thereof. If desired, a pair of small, helical garter springs 36 may be embedded in each end of the element 19 to contract the ends of the filtering element snugly around the tube 21. A large helical spring 37 preferably extends through the central opening in the element and surrounds the tube 21, for spacing the inner surface of the element from the tube. For the sake of simplicity, sheathing material 35 for the filtering element has been indicated schematically in the accompanying drawings, by showing only a single thickness surrounding the core of the filtering element, though more are present.

The novelty in the cartridge 19 lies in the fact that it is not a single uniform unit filled with a homogeneous mixture of fibrous materials; instead it has two sectors 39 and 40 of different characteristics and both extending the full length of the cartridge 19. Thus, the sheathing material 35 is filled with two different types of fibrous material, arranged so as to constitute two cylindrical sectors 39 and 40.

The larger sector 39 is the full-length safety-flow, thorough-filtering element. It may be of a relatively fine texture, tightly packed, preferably comprising densely packed filter material of such materials as spun cotton fibres, wood fibres, coconut fibres, cotton waste cut into fibrous form, etc., compacted together to form a filtering material with a relatively slow rate of flow when the oil is viscous but well adapted to pass warm oil and to filter it very thoroughly.

The full-length, rapid flow element 40 preferably comprises a different type of material such as sisal or hemp fibres having a much larger area of voids, so that its flow rate is substantially higher than that of the more compacted material in the sector 40 and correspondingly is less thorough in its filtering action. Its material may have more void areas, even though compacted by the same pressure that compacts the safety-flow element 39, or the element 40 may be filled with coarser material, somewhat less tightly packed.

By the proper selection of materials, the full-length safety-flow sector 39 is made to cooperate with the full-length rapid-flow sector 40. The less pervious material in the safety-flow element 39 is preferably selected for removing all entrained particles of deleterious material larger than a predetermined size that may safely be allowed to remain in the oil. It also is selected for its ability to pass warm oil in sufficient quantities to handle most of the warm engine oil. However, because of the relatively slow rate of flow of cold oil through material in the element 39 a temporary sacrifice in the effective removal of particles of small size is made by flowing the cold oil through the full-length fast-flow sector 40. The material 40 is so matched to the size of the cartridge and to the engine that it will pass cold oil in sufficient quantity to handle the needs of the engine and to remove the larger particles present in the oil.

In operation, unfiltered oil enters the unit 10 through the inlet passageway 12 and passes into the lower end of the chamber 13. When the engine is running, the oil will be under pressure and will fill the chamber 13 around the full circumference of the filter element 19. Large, heavy particles settle into the sump 31, where they can be flushed out at intervals through the plug 34.

The oil in the chamber 13 passes radially inwardly through the filter cartridge 19, either by way of the full-length fast-flow portion 40 or by way of the full-length safety-flow portion 39. The filtered oil then enters the tube 21 and is conducted to the outlet passageway 17.

During the warm-up period following cold starting of an engine or other machine, the abnormally viscous oil will not flow through the finer filtering material 39. Instead, practically all the cold oil flows through the coarser material 40. But at the same time that the oil is getting warm, it is imparting this warmth to the thorough-filter element 39. It does this not only from the outer periphery inward but more important along its full length at two radial sectors—the two faces 41 and 42 where the elements 39 and 40 meet along the radial faces thereof. This incremental warming soon has the oil passing through two warmed pie-shaped incremental elements of the sector 39 along its full length; simultaneously other incremental volumes adjacent these sectors are being warmed. The warming continues rapidly until soon the full sector 39 is being used.

While the filtering element 40 permits the passage of some relatively small deleterious particles at all times, none of the larger foreign particles will pass therethrough. Moreover, the major portion of the oil normally flows through the larger body of fine material 39, and repeated circulation of oil through the oil circuit causes substantially all particles of foreign matter larger than the maximum safe size eventually to be removed from the oil by the filtering element 19.

The invention thus achieves the maximum filtering possible without by-passing and achieves the most rapid warming of the filter cartridge 19 by its use of the two full-length sectors 39 and 40.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A filtering element comprising a single annular cartridge having a pervious body with a generally cylindrical outer surface adapted to absorb liquid and an inner cylindrical surface adapted to discharge said liquid, said cartridge comprising an annular cylindrical element divided longitudinally into two full-length sectors bordering each other on both radial faces of each, each disposed continuously between said outer and inner surfaces and filled with masses of filtering material, the mass in one sector having a faster flow rate and less thorough filtering than the mass in the other sector, whereby when the oil being filtered is cold, most of it will pass through said faster-flow-rate sector and when the oil becomes warmer, it will rapidly pass its warmth outwardly from the faster-flow-rate sector to the other sector by increments and will more and more be filtered through said other sector.

2. In a filter having a vertically disposed cylindrical housing with side walls and a lower end with a single inlet and a single outlet therethrough, the combination therewith of a vertically disposed pervious filtering cartridge comprising an annular cylindrical element with its outer surface spaced from said side walls the space therebetween being in communication with said inlet and with the space enclosed by its inner cylindrical surface connected to said outlet, said cartridge having two cylindrical sectors both extending its entire height between the intake side and the output side, said sectors bordering each other along their radial faces for their full heights and being composed of masses of filtering material, the mass in one sector having a different flow rate from that in the other sector, whereby cold and more viscous liquid will then filter principally through the sector having the higher flow rate and will, as it gets warmer, simultaneously begin warming the slower flow rate sector in incremental volumes extending outwardly from where the sectors border each other, so that the entire cartridge is rapidly warmed and then the liquid attains more thorough filtering by passing through the slower flow rate sector.

References Cited in the file of this patent

UNITED STATES PATENTS

| | | |
|---|---|---|
| 2,230,883 | Glass | Feb. 4, 1941 |
| 2,559,267 | Winslow et al. | July 3, 1951 |